United States Patent [19]
Yuasa

[11] Patent Number: 5,575,216
[45] Date of Patent: Nov. 19, 1996

[54] LINEAR MOTION ROLLING GUIDE UNIT

[75] Inventor: Kouhei Yuasa, Gifu, Japan

[73] Assignee: Nippon Thompson Co., Ltd., Tokyo, Japan

[21] Appl. No.: 510,336

[22] Filed: Aug. 2, 1995

[30] Foreign Application Priority Data

Aug. 9, 1994 [JP] Japan .................. 6-209213

[51] Int. Cl.⁶ .................................. F16C 29/06
[52] U.S. Cl. ....................................... 104/119
[58] Field of Search ................... 104/118, 119; 105/141, 144; 384/15, 45

[56] References Cited

U.S. PATENT DOCUMENTS

| | | | |
|---|---|---|---|
| 4,114,959 | 9/1978 | Christ | 384/15 |
| 4,200,341 | 4/1980 | Kauschke | 384/15 |
| 5,362,155 | 11/1994 | Ichida | 384/15 |

FOREIGN PATENT DOCUMENTS

| | | | |
|---|---|---|---|
| 62-35945 | 9/1987 | Japan . | |
| 1-82330 | 7/1989 | Japan . | |
| 5-26236 | 2/1993 | Japan . | |
| 6-2026 | 1/1994 | Japan . | |
| 2094735 | 9/1982 | United Kingdom | 104/119 |

*Primary Examiner*—Robert J. Oberleitner
*Assistant Examiner*—C. T. Bartz
*Attorney, Agent, or Firm*—Browdy and Neimark

[57] ABSTRACT

The linear motion rolling guide unit has a top seal secured to the casing which comprises a pair of lip seals that are in sliding contact with side areas of the upper surface of the track rail. The lip seals each have a pair of lip portions that incline from a base portion outwardly toward the sides of the casing. Because the lip portions are spaced a predetermined distance from each other, their sealing actions are not affected by each other, effectively preventing further ingress into the raceway grooves of foreign matters that have entered into the slider. When the pressure in the raceway grooves is increased by the supplied grease, the lip portion on the outer side is pressed with an increased force against the upper surface of the track rail, effectively preventing leakage of the grease.

6 Claims, 4 Drawing Sheets

5,575,216

LINEAR MOTION ROLLING GUIDE UNIT

BACKGROUND OF THE INVENTION

1. Field of the Invention

The present invention relates to a linear motion rolling guide unit, which is applied to machine tools, industrial robots, precision machines and testing equipment and in which a slider comprising a casing and end caps is slidably mounted on a track rail through rolling elements.

2. Description of the Prior Art

The linear motion rolling guide unit generally has a slider mounted slidable on a track rail through rolling elements, the slider comprising a casing and end caps. To describe in more detail, the linear motion rolling guide unit comprises: a track rail having raceway grooves formed on both longitudinal sidewall surfaces thereof; a casing mounted slidable on the track rail and having raceway grooves formed therein that face the raceway grooves of the track rail; end caps attached to the longitudinal ends of the casing; rolling elements rolling between the opposing raceway grooves; end seals attached to the outer end surfaces of the end caps; under seals provided to the underside of the casing on both sides; and a top seal provided to the underside of the casing which faces the top surface of the track rail.

In the linear motion rolling guide unit, foreign matters such as dirt, dust and chips, once they adhere to the raceway grooves of the track rail and slider, block the smooth running of the rolling elements as the slider slides on the track rail, and will eventually damage the raceway grooves shortening the life of the product. To prevent this, the linear motion rolling guide unit has end seals, under seal and top seal as sealing means between the slider and the track rail.

Of the sealing means, the end seals effectively remove foreign matters adhering to the top surface of the track rail. When foreign substances collect in bolt holes in the track rail, it is difficult to remove them completely by the end seals. Foreign matters that have moved past the end seals are scattered inside the slider and may enter into the raceway grooves where the rolling elements are running. To prevent the foreign matters that have passed the end seals unhindered from entering into the raceway grooves, a top seal is provided.

The raceway grooves of the track rail and the slider are supplied with grease. When grease adheres to the upper surface of the track rail, foreign matter sticks to the upper surface of the track rail and becomes difficult to remove by the end seals alone. The linear motion rolling guide unit has the top seal to prevent grease in the raceway grooves from leaking onto the top surface of the track rail.

The top seal has two functions of preventing foreign matters from entering the raceway grooves and of preventing grease from leaking into the top surface of the track rail.

As disclosed, for instance, in Japan Patent Utility Model Publication No. 35945/1987, the conventional top seal consists of a flat elongate plate and a longitudinally extending single rubber lip secured to the edge of the plate. The lip is inclined outwardly toward the raceway grooves of the casing, with the end of the lip pressed against the top surface of the track rail by its own elastic force. It is noted that the top seal has only one lip for sealing.

Another example of the top seal, disclosed in Japan Utility Model Publication No. 2026/1994, consists of a leaf spring made of a bent steel plate with its convex bent portion face up to make it elastic, and a pair of seal plates fixed to the edges of the leaf spring and extending longitudinally of the track rail. The seal plate is almost rectangular in lateral cross section and has two or more projected strips extending longitudinally on its underside. The underside of the seal plate is pressed against the upper surface of the track rail by the leaf spring to make longitudinal line contact with the upper surface of the track rail. Because the top seal has its seal plates pressed against the upper surface of the track rail by the elastic force of the leaf spring, the sealing performance of the top seal depends on the machining precision of the leaf spring. Therefore, when the machining precision of the leaf spring is bad, a sufficient pressing force to press the seal plates against the upper surface of the track rail is not produced, resulting in ingress of foreign matters and leakage of grease. Further, because the spring plate of the top seal is made by bending the steel plate in a convex shape, it is necessary to secure a gap between the underside of the slider and the upper surface of the track rail, making it difficult to reduce the size and thickness of the unit.

Still another example of the top seal, disclosed in Japan Utility Model Laid-Open No. 82330/1989, is a seal plate which extends longitudinally of the track rail and has an almost rectangular lateral cross section. The top seal is secured directly to the underside of the slider that opposes the upper surface of the track rail so that the underside of the top seal does not contact the upper surface of the track rail with a small gap therebetween. The top seal, because it does not contact the track rail, functions as a labyrinth seal but cannot perfectly block the leakage of the grease.

A further example of the conventional top seal is shown in FIG. 6 and 7. The top seal 60 comprises a plate 65 mounted to the inner underside 62 of the slider 61, U-shaped in lateral cross section, and facing the upper surface 64 of the track rail 63; and a pair of seal plates 66 secured to edges of the plate 65 and extending longitudinally of the track rail 63 (for example, Japan Patent Laid-Open No. 26236/1993).

The plate 65 is made of a flat steel plate, which has a base portion 68 whose width size is set larger than the diameter of the bolt hole 67 formed in the track rail 63, and a bent portion 69 made by bending the edges of the base portion 68 along the longitudinal direction. At the longitudinal ends of the plate 65, as shown in FIG. 7, a pair of elastic, slender insertion portions 70 are formed projectingly. By inserting the insertion portions 70 into insertion grooves formed at the side surfaces of the end caps, the top seal 60 is fixed to the slider 61.

Each of the seal plates 66 has an end lip 71 that contacts the upper surface 64 of the track rail 63 and which is inclined inwardly so that they approach each other. In other words, the end lips 71 are inclined toward the central area of the track rail 63. The elastic force of the seal plates 66 and of the insertion portions 70 of the plate 65 urges the end lips 71 of the seal plates 66 to press against the upper surface 64 of the track rail 63 with a predetermined pressure, thus forming a sealing plane.

The mounting of the top seal 60 to the slider 61 is done at the same time that the end caps (not shown) are attached to the longitudinal ends of the casing. With the insertion portions 70 of the plate 65 inserted into the insertion grooves formed in the side surfaces of the end caps, the end caps are fixed to the casing by screws, thus securing the top seal 60 to the slider 61.

The seal plates 66 have their end lips 71 pressed against the upper surface 64 of the track rail 63 by the elastic force of the insertion portions 70 of the plate 65 and also inclined inwardly toward the central area C of the track rail 63. This construction makes it difficult for foreign matters to enter into the raceway grooves 74, 75. However, because the end lips 71 are inclined inwardly toward the central area C of the track rail 63, when the pressure in the storage chamber 73 becomes high by the supplied grease, the end lips 71 of the seal plates 66 are pressed open toward the central area C of the track rail 63, letting the grease leak out into the central area C of the track rail 63. As a result, the grease that has leaked from the storage chamber 73 remains on the upper surface 64 of the track rail 63, causing foreign matters to adhere to the upper surface 64 of the track rail 63. Then, it is difficult to wipe away foreign matters sticking to the upper surface 64 by the end seals 76.

The assignee (Nippon Thompson Co., Ltd.) of this invention, therefore, developed a linear motion rolling guide unit having a top seal as shown in FIG. 3, 4 and 5 and filed the Japan Patent Application No. 101540/1994 for patent of the top seal. The linear motion rolling guide unit applied for patent comprises a track rail 31 installed on a base 31A and having raceway grooves 39 formed in longitudinally extending sidewall surfaces 41 thereof, and a slider 37 slidably mounted astride the track rail 31. Grease supplied from a grease nipple (not shown) is stored in a storage chamber 42A in the casing 32 to lubricate the raceway grooves 39 in the track rail 31 and the opposing raceway grooves 39 in the casing 32. End seals 36 has a sealing portion (not shown) that makes sliding contact with the sidewall surfaces 41 and the raceway grooves 39 of the track rail 31. The end seals 36 also have a seal projection 36A that is in sliding contact with the upper surface 44 of the track rail 31. The under seals 33 provide vertical sealing for the track rail 31, casing 32 and end caps 35. The top seal 49 is provided between the underside 43 of the casing 32 of the slider 37 and the upper surface 44 of the track rail 31. The underside 43 in a hollow portion 42 of the casing 32 of the slider 37 is formed with a recess 45 that opposes the upper surface 44 of the track rail 31. The underside 43 of the casing 32 are formed with holes 46 on the center line.

The top seal 49 has a plate 50 attached to the underside 43 of the casing 32. The plate 50 extends over the entire lengths of the underside 43 of the casing 32 and of the underside 43A of the end caps 35, and the end surfaces 50A of the plate 50 are in hermetic contact with the end seals 36. The top seal 49 also has a pair of lip seals 51, 52 secured to the edges of the plate 50. The plate 50 has bent portions 53 that are made by bending the edge portions of a flat steel plate along the longitudinal direction. The plate 50 has cylindrical projections 55 which enclose mounting holes 54. The cylindrical projections 55 are formed at positions corresponding to the holes 46 in the underside 43 of the casing 32.

The lip seals 51, 52 are made of elastic material such as rubber and plastics and are in sliding contact with the side areas S of the upper surface of the track rail 31. The lip seals 51, 52 are each secured to the plate 50 through a mounting base 56 and branch into an inner lip portion 57 and an outer lip portion 58. The inner lip portion 57 is inclined inwardly toward the central area C of the track rail 31 while the outer lip portion 58 is inclined outwardly in a direction opposite to the inner lip portion 57. The inner and outer lip portions 57, 58 are in sliding contact with the side areas S of the upper surface 44 of the track rail 31. The lip seals 51, 52 are secured to the plate 50 through burning by engaging a mounting step portion 59 of the mounting base 56 with the bent portion 53 of the plate 50.

In the top seal, the lip seals 51, 52 extend from the mounting base portions 56 and branch at their ends into two: the inner lip portion 57 inwardly inclined from a branch point 48 toward the central area C of the track rail 31 and the outer lip portion 58 outwardly inclined from the branch point 48 in a direction opposite to the inner lip portion 57. The inner lip portion 57 and the outer lip portion 58, on receiving an external force, tend to rotate together about the branch point 48. That is, when the pressure in the storage chamber 42A becomes high, the outer lip portion 58 rotates about the branch point 48 toward the center area C. At the same time the inner lip portion 57 tends to rotate toward the center area C. At this time, the end of the inner lip portion 57 tends to separate from the upper surface 44 of the track rail 31, so that its sealing performance is degraded, increasing the possibility of foreign matters entering through the inner lip portion 57. Conversely, when the inner lip portion 57 is pushed by foreign matters and rotated about the branch point 48 toward the side area S, the end of the outer lip portion 58 tends to separate from the upper surface 44 of the track rail 31, degrading the sealing performance of the outer lip portion 58 and increasing the possibility of the grease moving past the outer lip portion 58 and being discharged onto the upper surface 44 of the track rail.

SUMMARY OF THE INVENTION

An object of this invention is to solve the above-mentioned problems and to provide a linear motion rolling guide unit that has a top seal mounted to a casing, which has at least one pair of lip portions constructed in such a way that they can function independently of each other and are therefore not mutually affected in the sealing performance, in order that the top seal can achieve two functions simultaneously, that is, preventing foreign matters from entering into raceway grooves from the upper surface of the track rail and at the same time preventing grease from leaking from the raceway grooves out onto the upper surface of the track rail.

A primary objective of this invention is to provide a linear rolling guide unit, which comprises:

a track rail having raceway grooves formed on longitudinally extending side wall surfaces thereof;

a casing slidable relative to the track rail and having raceway grooves formed at positions facing the first raceway grooves;

end caps mounted to the longitudinal ends of the casing;

rolling elements circulating between the opposing raceway grooves, end seals attached to outer end surfaces of the end caps;

under seals provided to the underside of the casing on both sides; and a top seal mounted to the underside of the casing facing the upper surface of the track rail, the top seal comprising a plate longitudinally extending along edges of the underside of the casing and longitudinally extending lip seals secured to the plate and kept in sliding contact with side areas of the upper surface of the track rail, the lip seals each having lip portions spaced a predetermined distance from each other and inclining outwardly toward the raceway grooves of the casing.

Because the top seal has lip seals that are in sliding contact with the side areas of the upper surface of the track rail and because the lip seals each have at least a pair of lip portions that are spaced a predetermined distance from each other and incline outwardly toward the raceway grooves of the casing, foreign matters that have passed the end seals and entered into the slider can be blocked completely from entering into the raceway grooves by the action of the inner lip portion. As to foreign matters adhering to the upper surface of the track rail, they can easily be wiped away by the end seals as the slider performs the reciprocating motion.

The lip portions are spaced a predetermined interval from each other, so that deformation of one lip does not induce deformation of another, that is, they are not affected by each other and can function as independent sealing means. Hence, even when the pressure in the raceway grooves in the linear rolling guide unit becomes high, the sealing performance of the inner lip portion does not deteriorate. Nor is the sealing performance of the outer lip portion degraded by the foreign matters impacting the inner lip portion. The top seal therefore can maintain a stable sealing performance.

The outer lip portion prevents grease in the raceway grooves from leaking onto the upper surface of the track rail. Further, when the supplied grease increases the pressure in the raceway grooves, the outer one of the lip portions is pressed against the upper surface of the track rail with an increased pressure, enhancing the sealing performance and thereby reliably blocking the grease from leaking onto the upper surface of the track rail.

Further, because the outer lip portion is pressed strongly against the upper surface of the track rail by the pressure of the supplied grease, if foreign matters have passed through a gap between the end seals and the upper surface of the track rail and entered into the slider and if they have passed the inner lip portion, further ingress into the raceway grooves is reliably blocked by the outer lip portion.

The top seal therefore has two functions: a foreign matter ingress prevention function and a grease leakage prevention function. When the outer lip portion is pressed strongly against the upper surface of the track rail by the pressure of the grease, the inner lip portion does not separate from the upper surface of the track rail.

Further, because the plate of the top seal is a flat plate securely fixed to the underside of the casing by fastenings such as bolts, the mounting of the top seal to the slider can be done easily after assembly of the slider.

The lip seals of the top seal are each secured to the edges of the flat plate that is fixed to the underside of the casing, and the plate is not subjected to the bending process. This construction helps reduce the thickness of the linear rolling guide unit.

Furthermore, because the lip seals use their own elastic force to urge and press the ends of their lip portions against the upper surface of the track rail, the sealing performance of the top seal is not affected by the fabrication precision of the plate unlike the conventional structure in which the elastic force of a leaf spring is used to press the lip portions of projected strips against the upper surface of the track rail. Therefore no variations occur in the sealing performance among products.

DETAILED DESCRIPTION OF THE EMBODIMENT

Figure 1:
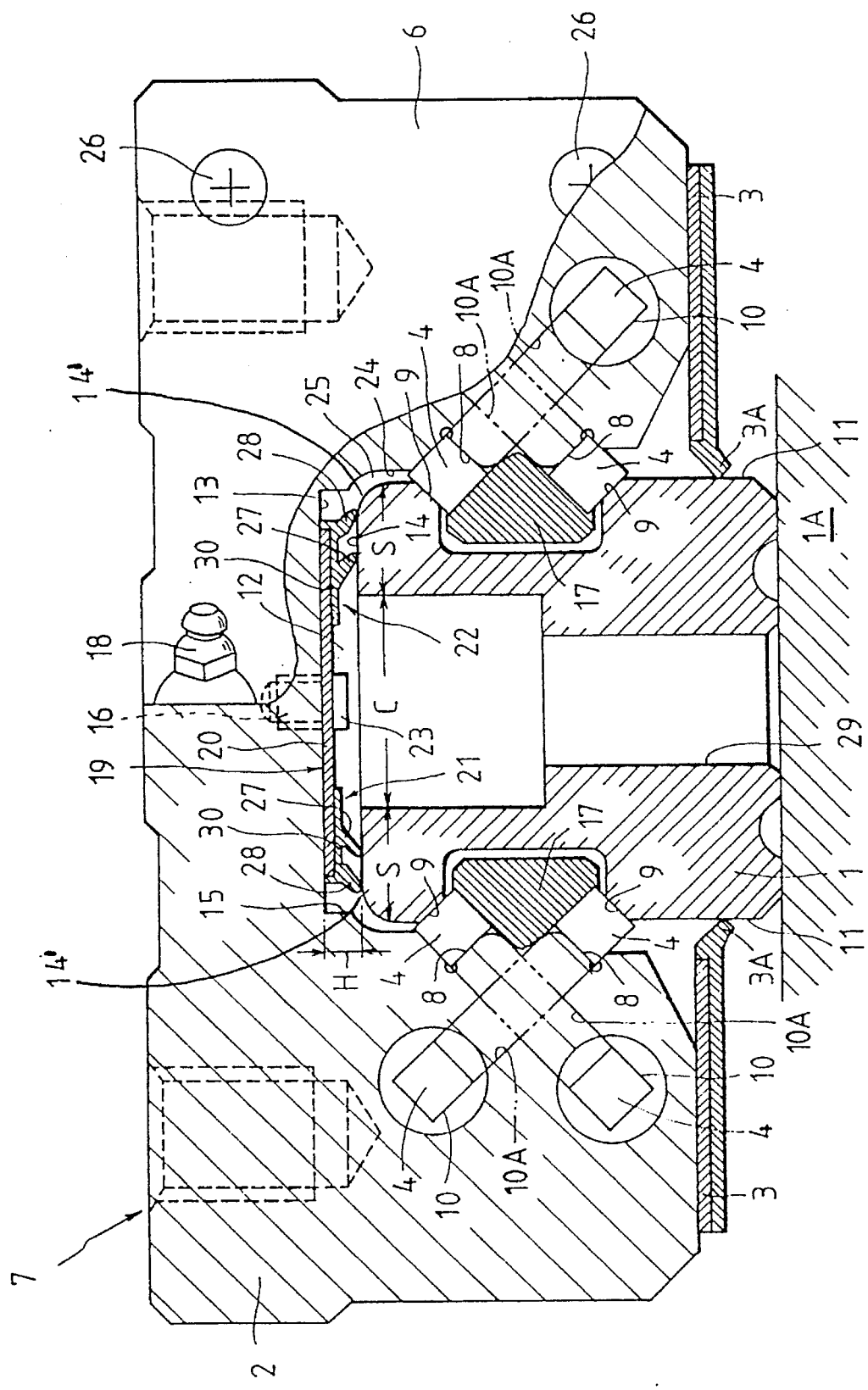
FIG. 1 is a partly cutaway lateral cross section showing one embodiment of the linear motion rolling guide unit according to this invention.
Figure 2:
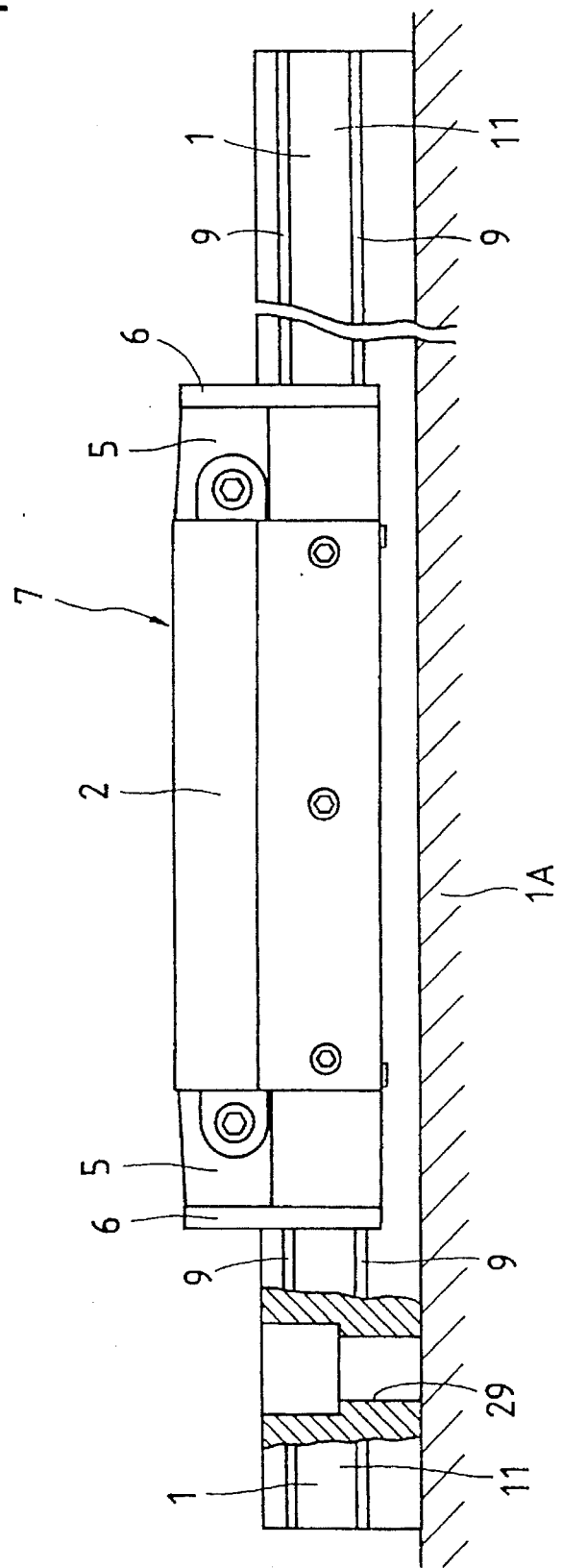
FIG. 2 is a schematic diagram showing the linear motion rolling guide unit of FIG. 1.
Figure 3:
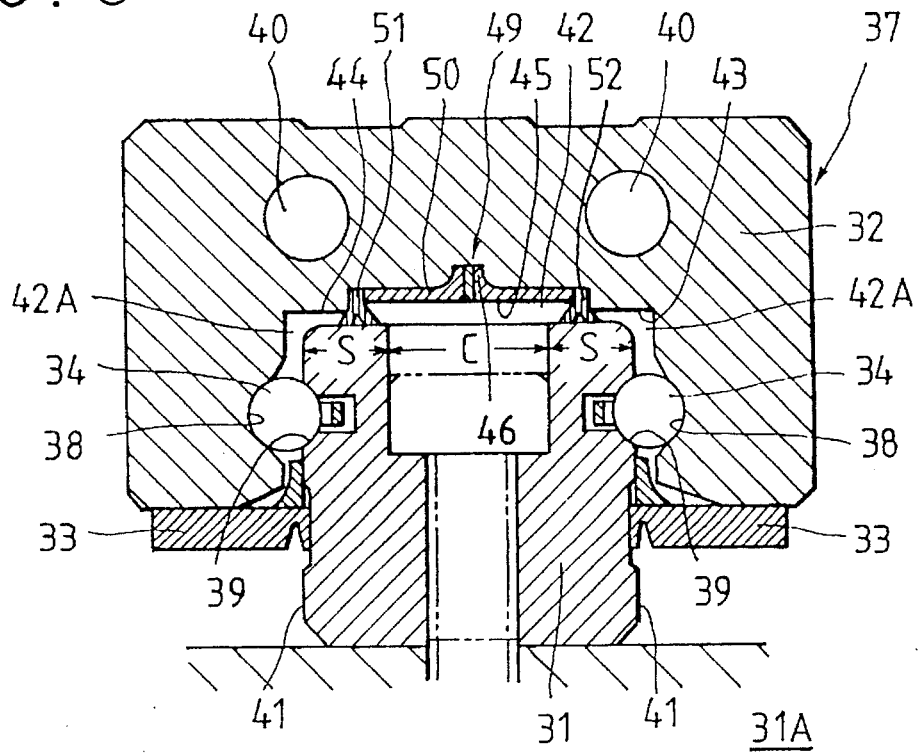
FIG. 3 is a cross section of a linear motion rolling guide unit according to Laid-Open Japanese Application, No. 286617/1995.

One embodiment of the linear motion rolling guide unit of this invention will be described by referring to the accompanying drawings. FIG. 1 shows one embodiment of a type that uses rollers for the rolling elements 4. It is noted that this invention can also be applied to a type that uses balls instead of rollers.

This linear motion rolling guide unit includes a track rail 1 securely mounted on a base 1A and having two longitudinally extending raceway grooves 9, 9 formed on each of sidewall surfaces 11, and a slider 7 slidably mounted a stride the track rail 1. An upper surface 14 of the track rail 1 is formed with bolt holes 29 through which to pass mounting bolts to secure the track rail 1 to the base 1A. The slider 7 is slidable relative to the track rail 1, and includes a casing 2 having raceway grooves 8 formed at positions that face the corresponding raceway grooves 9, rolling elements 4 in the form of rollers that roll between the opposing raceway grooves 8, 9 to allow relative motion between the casing 2 and the track rail 1, end caps 5 attached to the longitudinal ends of the casing 2, the longitudinal direction representing a direction in which the casing 2 slides, and a sealing device for sealing between the slider 7 and the track rail 1.

The slider 7 is mounted astride and slides along the track rail 1 with the rolling elements 4 interposed between them. The rolling elements 4 are rollers circulating along the raceway grooves 9 of the track rail 1. The rolling elements 4 running under load through the raceway grooves 9 of the track rail 1 are led into direction change paths 10A formed in the end caps 5 and further into return paths 10 formed in the casing 2 so as to be parallel to the raceway grooves 8. The rolling elements 4 circulate endlessly through the endless circulation paths. The rolling motion of the rolling elements 4 loaded between the raceway grooves 8 of the slider 7 and the raceway grooves 9 of the track rail 1 allows the slider 7 to slide relative to the track rail 1.

The rolling elements 4 are kept in the casing 2 by retainer members 17. That is, both inner sidewall surfaces 24 of the casing 2 are each formed with two raceway grooves 8, 8 and, to prevent the rolling elements 4 from coming off the casing 2, the retainer members 17 having an almost triangular cross section are mounted to the casing 2 so as to hold two series of rolling elements 4 between the retainer member 17 and the inner sidewall surface 24 of the casing 2.

The sealing device comprises: end seals 6 attached to the end surfaces of the end caps 5; under seals 3 provided to the underside of the casing 2 and the end caps 5 on both sides; and a top seal 19 provided between the underside 13 of the casing 2 of the slider 7 and the upper surface 14 of the track rail 1.

The end seals 6 are attached to the end surfaces of the end caps 5 and fastened to the casing 2 along with the end caps 5 by screws 26. The end surfaces of the end seals 6 are provided with a grease nipple 18, through which grease is supplied to a storage chamber 25 in the casing 2 to lubricate the opposing raceway grooves 8, 9. The end seals 6 have a sealing portion (not shown) that are in sliding contact with sidewall surfaces 11 of the track rail 1 and with the raceway grooves 9, 9. The end seals 6 also have a sealing projection (36A of FIG. 4) that is in sliding contact with the upper surface of the track rail 1 and is inclined outwardly.

The under seals 3 provide a vertical seal for the track rail 1, the casing 2 and the end caps 5. The under seals 3 have a seal projection 3A secured to one edge of a flat steel plate as by burning and are mounted to the underside of the slider 7 on each side. With the under seals 3 mounted to the underside of the slider 7, the seal projections 3A incline downwardly and slidably contact the sidewall surfaces 11 of the track rail 1.

The top seal 19 is provided between the underside 13 of the casing 2 of the slider 7 and the upper surface 14 of the track rail 1. The underside 13 of the casing 2 that forms the slider 7, that is, the underside 13 of a hollow portion 12 inside the casing 2 is formed with a recessed groove 15 that faces the upper surface 14 of the track rail 1. The underside 13 of the casing 2 is formed with mounting holes 16 on the center line.

The top seal 19 comprises a plate 20 mounted to the underside 13 of the casing 2 and a pair of lip seals 21, 22 secured to both edges of the plate 20 as by burning. The plate 20 extends longitudinally along the edges of the underside 13 of the casing 2. The lip seals 21, 22 are secured to the plate 20 and extends longitudinally in sliding contact with the side areas of the upper surface 14 of the track rail 1. The lip seals 21, 22 are inclined outward toward the raceway grooves 8 of the casing 2 and have lip portions 27, 28 spaced a predetermined distance from each other. The plate 20 is made of a flat steel plate. The plate 20 extends longitudinally over the underside 13 of the casing 2 and the underside of the end caps 5, with the end surfaces of the plate 20 in sealing contact with the end seals 6 (in the same relationship as that between the end surfaces 50A of the plate 50 and the end seals 36 of FIG. 4).

The top seal 19 is mounted to the underside 13 of the slider 7, with the plate 20 of the top seal 19 fitted in the recessed groove 15 of the casing 2 in such a way that the hole in the plate 20 and the mounting hole 16 in the casing 2 are aligned. A bolt 23 is passed through these aligned holes and fastened to secure the top seal 19 to the underside 13 of the slider 7. Mounting of the top seal 19 to the slider 7 may be done after assembly of the slider 7. The recessed groove 15 formed in the underside 13 of the casing 2 allows the linear motion rolling guide unit to reduce its thickness while securing the distance H between the plate 20 and the upper surface 14 of the track rail 1.

The lip seals 21, 22 of the top seal 19 are formed of elastic material such as rubber and plastics. When engineering plastics is used as the material, the lip seals 21, 22 and the plate 20 may be integrally formed of the engineering plastics. The lip seals 21, 22 are in sliding contact with the side areas S of the upper surface of the track rail 1, and extend longitudinally of the track rail 1. The sealing members 21, 22 each have an outer lip portion 28 and an inner lip portion 27, both extending from a mounting base portion 30 on the plate 20 and inclined outwardly toward the raceway grooves 8, 8 of the casing 2. The lip portions 27, 28 are integrally formed with the mounting base portion 30 and are spaced a predetermined interval from each other. The inner lip portion 27 and the outer lip portion 28 are formed of an elastic material and have a long lip to allow easy deformation, so that the force with which the lip end presses against the upper surface 14 of the track rail 1 is relatively small. Hence, the slider 7 can move with a smaller sliding resistance than in the conventional structure and therefore can permit a fast sliding motion. Because the outer and inner lip portions 28, 27 are spaced a predetermined distance, that is, because their sealing performances are independent of each other, there is no possibility of one lip affecting the other, such as deformation of one lip inducing deformation of the other.

Still referring to FIG. 1, it is seen that the respective lip portions of the lip seals 21 and 22 are inclined toward the second raceways grooves 8 of the casing 2 on either respective side (i.e., outwardly as seen in FIG. 1). The front ends of the lip portions 21, 22 (i.e., the outer extremities of the lip portions distal the plate 20) are seen in the figure to be in contact with the respective outlying side areas 14' of the upper surface 14 (proximal the unlabeled curved shoulder of the track rail 1 in FIG. 1). Due to their elastic nature, the front ends are in hermetic sliding contact with the side areas 14'.

Figure 4:
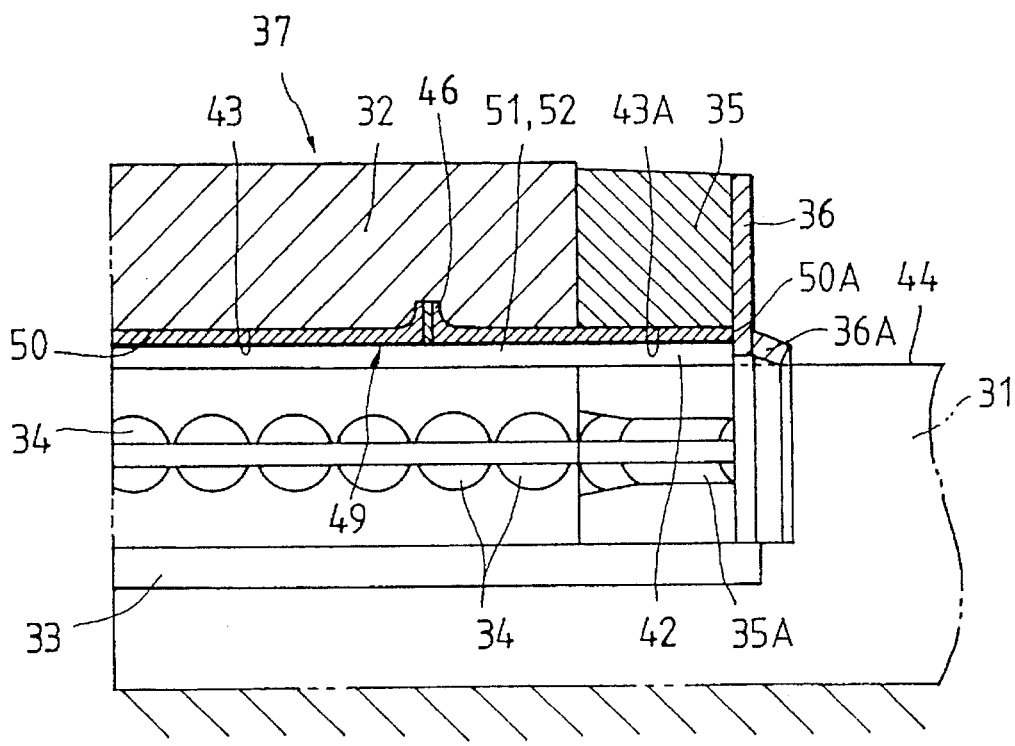
FIG. 4 is a cross section of the linear motion rolling guide unit of FIG. 3.
Figure 5:
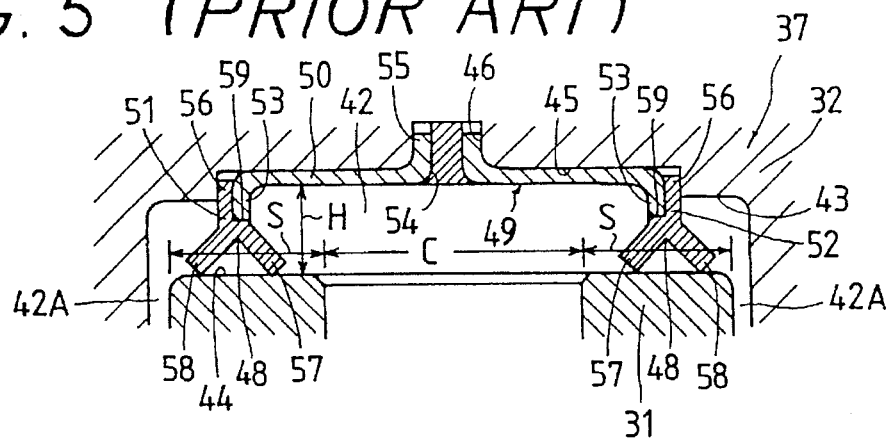
FIG. 5 is an enlarged cross section showing an essential portion of the linear motion rolling guide unit of FIG. 3.
Figure 6:
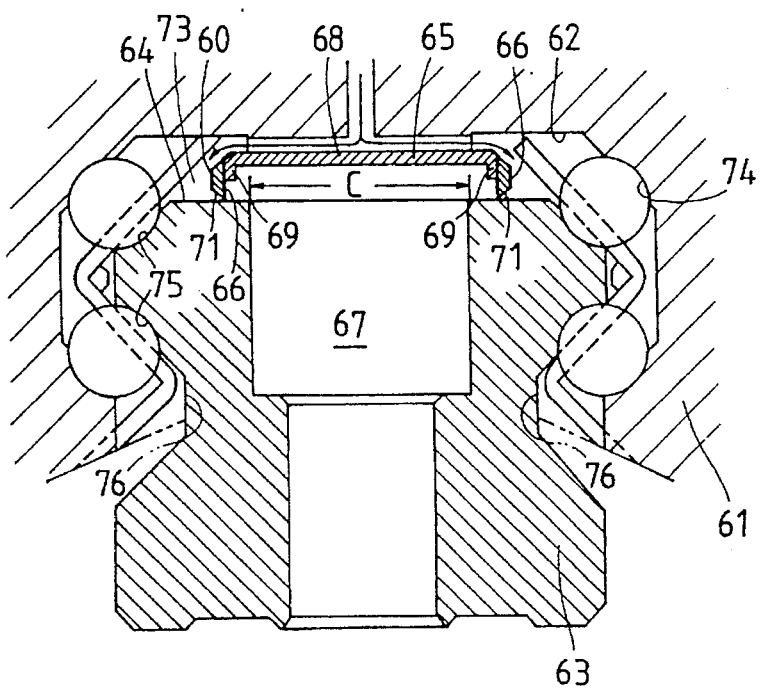
FIG. 6 is an enlarged cross section showing an essential portion of another conventional linear motion rolling guide unit.
Figure 7:
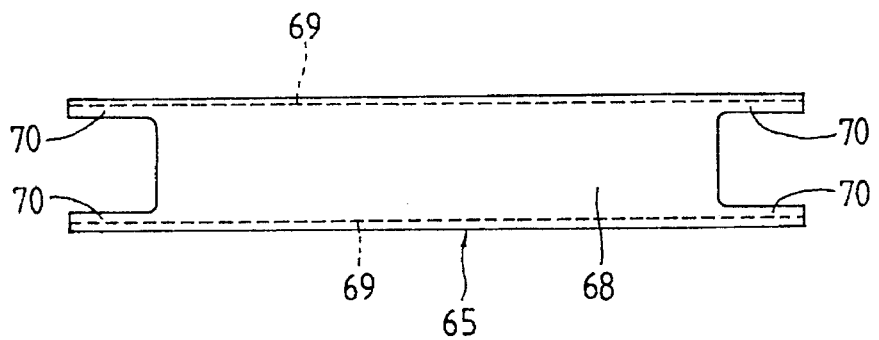
FIG. 7 is a plan view of a top seal applied to the conventional linear motion rolling guide unit of FIG. 6.

Next, we will explain the sealing function of the sealing device in this linear motion rolling guide unit. Because the end seals 6 are attached to the outer end surfaces of the end caps 5, foreign matters adhering to the track rail 1 are prevented from entering between the upper surface 14 of the track rail 1 and the underside 13 of the slider 7 and between the sidewall surfaces 11 of the track rail 1 and the inner sidewall surfaces 24 of the slider 7. If foreign matters should enter into the interior of the slider 7 from the upper surface 14 of the track rail 1, they are discharged from the end seals 6 to the outside. That is, because the seal projections of the end seals 6 (36A in FIG. 4) are inclined outwardly, as shown in FIG. 4, the foreign matters that have entered into the slider 7 are discharged outside from the end seals 6 as the slider 7 moves.

Foreign matters that may enter into the raceway groove from the base 1A are blocked by the under seals 3. If foreign matters should enter into the slider 7 from the under seals 3, they are discharged outside from the under seals 3. That is, as the storage chamber 25 is supplied with grease and air and its interior pressure increases, the foreign matters are discharged outside along with grease through the seal projection 3A of the under seal 3 that is inclined downwardly. Discharging the grease from the under seals 3 poses no problem.

Further, when foreign matters get between the upper surface 14 of the track rail 1 and the underside 13 of the slider 7, they are prevented from entering into the raceway grooves 8, 9 by the top seal 19 because the inner and outer lip portions 27, 28 of the top seal 19 are pressed at their ends against the upper surface 14 of the track rail 1 by their own elastic force.

As the grease supplied from the grease nipple 18 increases the pressure in the raceway grooves 8, 9, the outer lip portion 28 is pressed more strongly against the upper surface 14 of the track rail 1, which in turn enhances the effectiveness in preventing the grease leakage toward the upper surface 14 of the track rail 1 from the raceway grooves 8, 9. Because the grease does not leak onto the upper surface 14 of the track rail 1, foreign matters adhering to the upper surface 14 of the track rail 1 are easily wiped away by the seal projection of the end seals 6.

Furthermore, because the grease pressure presses the outer lip portion 28 strongly against the upper surface 14 of the track rail 1 to enhance the sealing performance of the outer lip portion 28, if foreign matters enter from the inner lip portion 27, their further ingress into the raceway grooves 8 and 9 is effectively blocked by the outer lip portion 28. In this way, the top seal 19 has both the foreign matter ingress prevention function and the grease leakage prevention function.

Since the outer lip portion 28 and the inner lip portion 27 are spaced a predetermined distance from each other, deformation of one lip does not induce deformation of the other. That is, they do not affect each other. In other words, there is no possibility that when the outer lip portion 28 is pressed strongly against the upper surface 14 of the track rail 1 by the pressure of the grease, the inner lip portion 27 may float reducing the pressing force of the inner lip portion 27 against the upper surface of the track rail 1 or in a worst case the end of the inner lip portion 27 may separate from the upper surface 14 of the track rail 1. Therefore, the top seal 19 can maintain a stable sealing performance against ingress of foreign matters and leakage of grease.

Moreover, because the inner lip portion 27 and the outer lip portion 28 use their own elastic force in pressing their ends against the upper surface 14 of the track rail, in other words because the lip portions are not pressed against the upper surface of the track rail by using the elastic force of a leaf spring unlike in the second conventional example, the sealing performance of the top seal 19 is hardly influenced by the fabrication precision of the plate 20, producing no variations in the sealing performance among the products.

While in the above embodiment we have described the top seal 19 having two lip portions, the sealing structure may have three or more lip portions. Although the above description concerns a case where the outer end surfaces of the end caps 5 are each attached with one end seal 6, it is possible to attach two or more end seals to each of the outer end surfaces of the end caps 5 to completely prevent grease leakage from the end surfaces of the slider 7. In that case, half the end seals are preferably mounted so that their seal projections face in a direction opposite to that of the seal projections of the remaining end seals. In this construction, the foreign matters are discharged from the under seals 3.

What is claimed is:

1. A linear motion rolling guide unit comprising:

a track rail extending in a longitudinal direction including first raceway grooves formed on longitudinally extending side wall surfaces of the track rail;

a casing slidable relative to the track rail and including second raceway grooves formed at positions on two sides of the casing, the second raceway grooves facing the first raceway grooves;

end caps mounted to longitudinal ends of the casing;

rolling elements circulating between the opposing first raceway grooves and second raceway grooves;

end seals attached to outer end surfaces of the end caps;

under seals provided on an underside of the casing on both of the sides; and a top seal mounted to the underside of the casing, the underside facing an upper surface of the track rail, the top seal comprising a plate longitudinally extending along edges of the underside of the casing and longitudinally extending lip seals each being secured to one longitudinal side of the plate;

the lip seals each including at least one pair of lip portions spaced a predetermined distance from each other, the lip portions generally parallel to one another and extending with an inclination toward respective ones of the second raceway grooves of the casing, the front ends of the lip portions being in hermetic sliding contact with side areas of the upper surface of the track rail; and lip means for keeping the seals in hermetic contact with the track rail to prevent grease which has been placed between the casing and the track rail from leaking therebetween and to prevent foreign matter from entering into the second raceway grooves from the upper surface of the track rail.

2. The linear rolling guide unit according to claim 1, wherein the plate of the top seal is formed of a flat plate fixed to the underside of the casing.

3. The linear rolling guide unit according to claim 1, wherein the lip seals are capable of elastic deformation.

4. The linear rolling guide unit according to claim 1, wherein the plate of the top seal is a core made of a metal and the lip seals are sealing members made of synthetic rubber and secured to the plate.

5. The linear rolling guide unit according to claim 1, wherein the top seal is made of plastics.

6. The linear rolling guide unit according to claim 1, wherein the lip portions of each pair of lip seals are generally parallel to one another.

* * * * *